US010754679B2

(12) United States Patent
Kim et al.

(10) Patent No.: US 10,754,679 B2
(45) Date of Patent: Aug. 25, 2020

(54) METHOD AND APPARATUS FOR HANDLING NETWORK I/O DEVICE VIRTUALIZATION

(71) Applicant: TMAX CLOUD CO., LTD., Seongnam-si, Gyeonggi-do (KR)

(72) Inventors: Seong-Joong Kim, Seongnam-si (KR); Da-Hyun Jang, Seongnam-si (KR)

(73) Assignee: TMAX CLOUD CO., LTD., Seongnam-si (KR)

( * ) Notice: Subject to any disclaimer, the term of this patent is extended or adjusted under 35 U.S.C. 154(b) by 184 days.

(21) Appl. No.: 15/853,298

(22) Filed: Dec. 22, 2017

(65) Prior Publication Data

US 2018/0181425 A1 Jun. 28, 2018

(30) Foreign Application Priority Data

Dec. 27, 2016 (KR) .................. 10-2016-0180464

(51) Int. Cl.
*G06F 9/455* (2018.01)
(52) U.S. Cl.
CPC ............... *G06F 9/45558* (2013.01); *G06F 2009/45579* (2013.01); *G06F 2009/45583* (2013.01)
(58) Field of Classification Search
CPC ....... G06F 9/45558; G06F 2009/45579; G06F 2009/45583
See application file for complete search history.

(56) References Cited

U.S. PATENT DOCUMENTS 9,836,421 B1 * 12/2017 Bshara .................. G06F 13/387
9,959,214 B1 * 5/2018 Habusha ............. G06F 12/1009
(Continued)

FOREIGN PATENT DOCUMENTS

KR          10-0871743 B1    12/2008
KR    10-2011-0064539 A      6/2011
(Continued)

OTHER PUBLICATIONS

Nanos et al. A smart HPC interconnect for clusters of virtual machines. [online]. Springer-Verlag., pp. 398-406. Retrieved From the Internet <https://dl.acm.org/citation.cfm?id=2238487> (Year: 2012).*

(Continued)

*Primary Examiner* — Emerson C Puente
*Assistant Examiner* — Jonathan R Labud
(74) *Attorney, Agent, or Firm* — Novick, Kim & Lee, PLLC; Sang Ho Lee

(57) ABSTRACT

A method for handling network I/O device virtualization is provided. The method comprises, translating, by a virtual machine monitor, a guest physical address of a virtual machine to a host physical address in response to an I/O request from at least one virtual machine among a plurality of virtual machines, transmitting, by a virtual machine emulator, an instruction request including the translated address information to an extended device driver associated with the virtual machine from which the I/O request is forwarded, inserting, by the extended device driver, the translated address into a transmission queue, and performing a direct memory access for the I/O request using a physical I/O device according to the transmission queue.

19 Claims, 7 Drawing Sheets

(56) References Cited

U.S. PATENT DOCUMENTS

| | | | |
|---|---|---|---|
| 2006/0143311 A1* | 6/2006 | Madukkarumukumana | G06F 13/28 710/1 |
| 2007/0057957 A1* | 3/2007 | Wooten | G06F 12/1009 345/566 |
| 2008/0092148 A1* | 4/2008 | Moertl | G06F 12/1009 719/321 |
| 2008/0148005 A1* | 6/2008 | Moertl | G06F 12/1081 711/202 |
| 2012/0216191 A1* | 8/2012 | Tsai | G06F 9/45558 718/1 |
| 2013/0174155 A1 | 7/2013 | Yang et al. | |
| 2014/0068137 A1* | 3/2014 | Kegel | G06F 12/1009 711/6 |
| 2015/0370586 A1 | 12/2015 | Cooper et al. | |

FOREIGN PATENT DOCUMENTS

| | | |
|---|---|---|
| KR | 10-1387971 B1 | 4/2014 |
| WO | 2006/039643 A1 | 4/2006 |
| WO | 2008/005722 A1 | 1/2008 |
| WO | 2011/075870 A1 | 6/2011 |
| WO | 2013/081884 A1 | 6/2013 |

OTHER PUBLICATIONS

S.J.Kim, "New Virtualised AP for Independent Wireless Network Composition". Electronic Letters, vol. 52 No. 7 pp. 562-564, Apr. 1, 2016.

\* cited by examiner

METHOD AND APPARATUS FOR HANDLING NETWORK I/O DEVICE VIRTUALIZATION

CROSS-REFERENCE TO RELATED APPLICATIONS

This application claims the benefit under 35 U.S.C. § 119 of a Korean Patent Application No. 10-2016-0180464 filed Dec. 27, 2016, in the Korean Intellectual Property Office, the entire contents of which are hereby incorporated by reference.

BACKGROUND

The present disclosure relates to a method and apparatus for handling network I/O device virtualization.

Virtualization technology is a technology that abstracts various physical resources and present them to users and it is the most important technology when constructing a cloud computing environment. There are various virtualization technologies including system virtualization technology, which is a virtualization technology for hardware devices existing in physical servers such as a central processing unit (CPU), memory, and I/O device, operating system virtualization technology, which is a technology for isolating or distributing shared resources based on containers while sharing the kernel, and so on.

Among the various virtualization technologies, system virtualization technology provides the flexibility of the infrastructure of the cloud and has the most significant impact on the performance of the physical server. In system virtualization technology, virtualization is performed on the central processing unit, memory, I/O device, etc. through system software called 'hypervisor' or 'virtual machine monitor'. According to the system virtualization technology, virtualized resources can be allocated to a logical space called a virtual machine, thereby providing an environment capable of operating a plurality of logical devices in one physical device.

System virtualization technology can be divided into paravirtualization technology that improves performance through modification of guest operating system instruction set and full virtualization technology which performs emulation for all instructions without modifying instruction set. Recently, technologies such as Intel's VT (Virtualization Technology) and AMD's SVM (Secure Virtual Machine) have been widely used to minimize the cost of central processing unit and memory virtualization with the help of hardware.

Still, there are various limitations in using conventional virtualization technology, and a new virtualization method is desired to improve it.

SUMMARY

An aspect of the present disclosure is to provide a method and apparatus for handling network I/O device virtualization in a virtual machine environment that separates and processes packets provided from a plurality of virtual machines into a control channel and a data channel.

An aspect of the present disclosure is to provide a method and apparatus for handling network I/O device virtualization in a virtual machine environment that performs memory mapping using a remapping context entry separated on a virtual machine basis.

An aspect of the present disclosure is to provide a method and apparatus for handling network I/O device virtualization in a virtual machine environment in which a host machine has extended device drivers matched to device drivers of a plurality of virtual machines and the extended device drivers are exposed in the virtual machines.

In accordance with an aspect of the present disclosure, a method for handling network I/O device virtualization comprises the steps of, translating, by a virtual machine monitor, a guest physical address of a virtual machine to a host physical address in response to an I/O request from at least one virtual machine among a plurality of virtual machines, transmitting, by a virtual machine emulator, an instruction request including the translated address information to an extended device driver associated with the virtual machine from which the I/O request is forwarded, inserting, by the extended device driver, the translated address into a transmission queue, and performing a direct memory access for the I/O request using a physical I/O device according to the transmission queue.

In an embodiment, the translating address may include requesting, by the virtual machine emulator, an address translation to the virtual monitor upon receiving the I/O request. For example, the method for handling network I/O device virtualization may further comprise forming a control channel between a device model of the virtual machine emulator and the extended device driver using a kernel interface.

In an embodiment, the transmitting the instruction request may include the transmitting the instruction request through the control channel with the extended device driver associated with the device model of the virtual machine.

In an embodiment, the extended device driver may be exposed in the virtual machine.

In accordance with an aspect of the present disclosure, a method for handling network I/O device virtualization comprises the steps of, forwarding a transmission instruction to a virtual machine emulator by handling an I/O request interrupt from at least one virtual machine of a plurality of virtual machines, transmitting, by the virtual machine emulator, an instruction request to an extended device driver associated with the virtual machine by inserting information on the virtual machine which has forwarded the I/O request, inserting, by the extended device driver, an address of the I/O request into a transmission queue, and translating, by direct memory access mapping hardware, a guest physical address of the address included in the transmission queue to a host physical address based on the identifier of the virtual machine that generated the interrupt.

In an embodiment, the method for handling network I/O device virtualization may further comprise generating a remapping context entry including a context entry divided for each of the plurality of virtual machines.

In an embodiment, wherein the translating may comprise performing, by the direct memory access mapping hardware, the address translation by mapping a domain from the remapping context entry based on the identifier of the virtual machine identifier included in the transmission queue.

According to an embodiment, the method for handling network I/O device virtualization may further comprise forming a control channel between a device model in the virtual machine emulator and the extended device driver using a kernel interface.

In an embodiment, the transmitting an instruction request may comprise transmitting the instruction request through the control channel of the extended device driver associated with the device model of the virtual machine.

In an embodiment, the virtual machine emulator may not perform emulation for the I/O request.

In accordance with an aspect of the present disclosure, a method for handling network I/O device virtualization according to an embodiment of the present disclosure comprises, generating extended device drivers mapped to a plurality of virtual machines in a host machine, performing access setting of the extended device driver to expose the mapped extended device driver in the virtual machine, inserting a host physical address into a transmission queue for the exposed extended device driver after translating a guest physical address included in an I/O request generated by the virtual machine into the host physical address, and performing a direct memory access based on the transmission queue through the exposed extended device driver.

In an embodiment, the inserting into the transmission queue may comprise translating, by a virtual machine monitor, the guest physical address into the host physical address in response to a request of the virtual machine emulator that received the I/O request.

According to an embodiment, the method for handling network I/O device virtualization may further comprise forming a control channel between a device model of the virtual machine emulator and the exposed extended device driver.

In accordance with an aspect of the present disclosure, a computer readable storage medium stored thereon a program for executing a method of the present disclosure by the computer is provided.

In accordance with an aspect of the present disclosure, a method and apparatus for handling network I/O device virtualization in a virtual machine environment capable of flexibly translating addresses for a plurality of virtual machines using a single physical I/O device by assigning context entries for each virtual machine can be provided.

In accordance with an aspect of the present disclosure, a method and apparatus for handling network I/O device virtualization in a virtual machine environment capable of using a device driver in the virtual machine as a native device driver by providing an extended device driver for each virtual machine in a host machine and exposing the extended device driver in a virtual machine can be provided.

In accordance with an aspect of the present disclosure, a method and apparatus for handling network I/O device virtualization in a virtual machine environment which is capable of improving performance by reducing data copying burden can be provided as the data is directly I/O to/from the outside without being copied in a process of performing I/O operations of a virtual machine.

BRIEF DESCRIPTION OF THE FIGURES

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
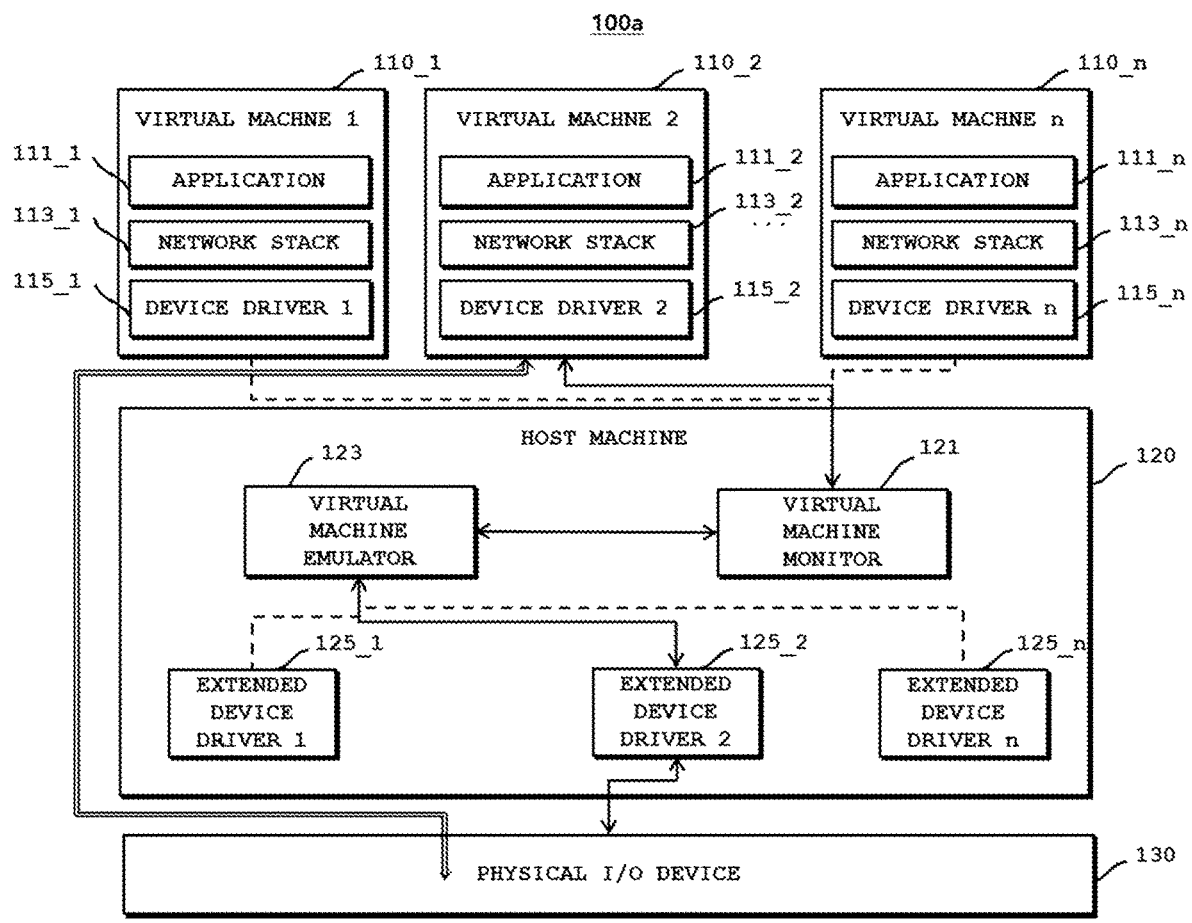
FIG. 1 is a diagram illustrating a computing platform according to an embodiment of the present disclosure.

Hereinafter, preferred embodiments of the present disclosure will be described in detail with reference to the accompanying drawings in order to make the technical idea of the present invention clear. In the following description of the present invention, a detailed description of known functions and configurations will be omitted when it may make the subject matter of the present invention rather unclear. In the drawings, elements having substantially the same functional configuration are given the same reference numerals and symbols as possible even if they are appeared on different drawings. For convenience of description, the apparatus and method are described together when necessary.

The specific structural or functional description is merely illustrative for the purpose of describing embodiments of the present disclosure with respect to various embodiments of the present disclosure disclosed herein. Various embodiments of the present disclosure may be implemented in various forms, and may not be construed as limited to the embodiments set forth herein.

Expressions such as "$1^{st}$", "$2^{nd}$" "first" and "second" used in various embodiments may be used to refer to various elements regardless of the order and/or the priority, but the above elements should not be restricted to the above expressions. For instance, the first element may be named the second element, and vice versa, without departing the scope of claims of the present disclosure.

The terms used in the specification are intended to describe certain embodiments only, and should by no means restrict the scope of another embodiment. Unless clearly used otherwise, expressions in a singular form include a meaning of a plural form.

All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in the present disclosure, they may not be interpreted to exclude embodiments of the present disclosure.

Figure 2:
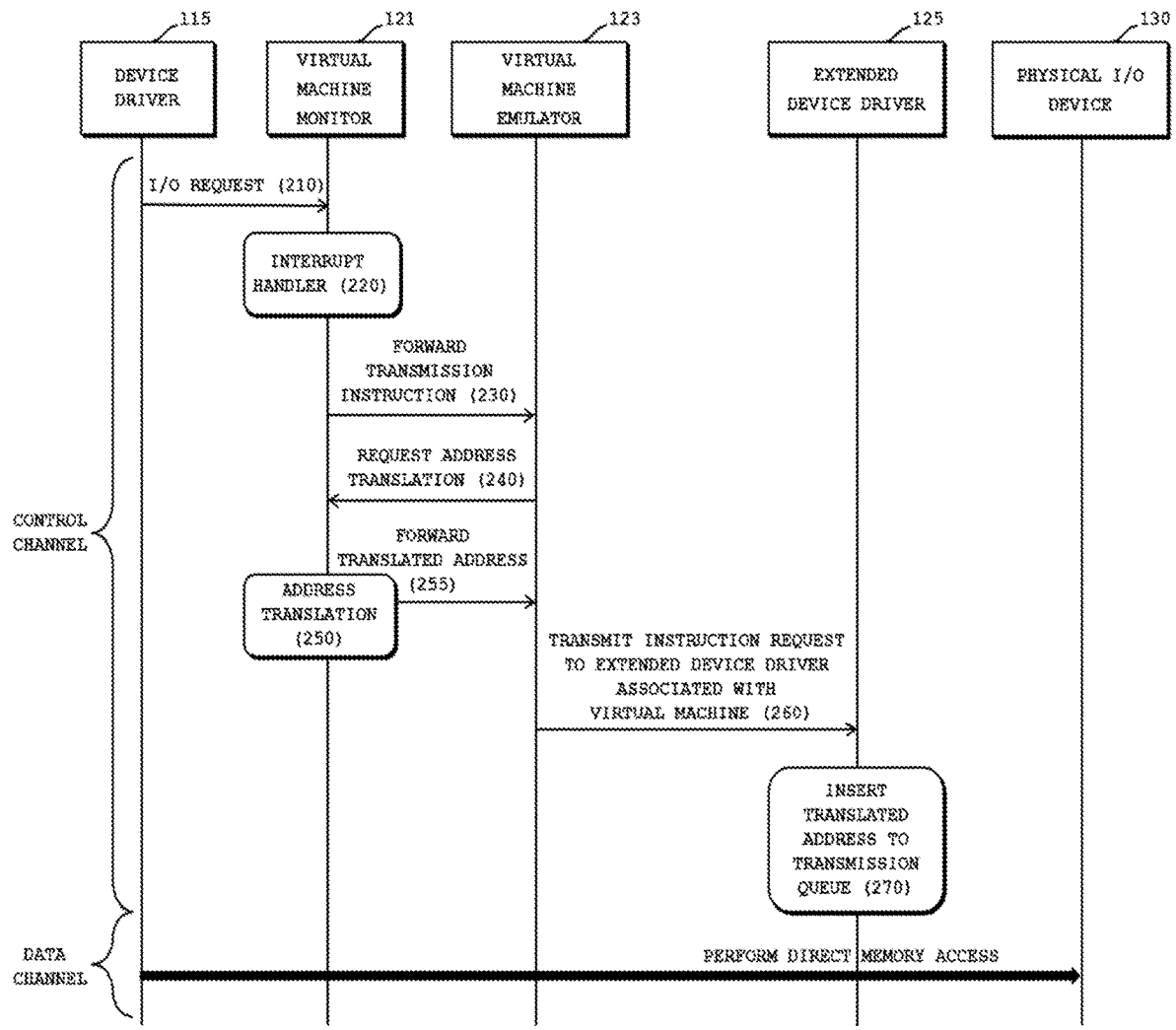
FIG. 2 is a sequence diagram illustrating operations performed in the computing platform of FIG. 1.

FIG. 1 is a diagram illustrating a computing platform according to an embodiment of the present disclosure, and FIG. 2 is a sequence diagram illustrating operations performed in the computing platform of FIG. 1. Hereinafter, the configuration and operation of a computing platform according to an embodiment of the present disclosure will be described together with reference to FIG. 1 and FIG. 2.

The computing platform 100a according to an embodiment of the present disclosure may include a plurality of virtual machines 110_1, 110_2, . . . , 110_n (hereinafter referred to as 110) implemented in a virtual machine environment, a host machine 120, and a physical I/O device 130. The plurality of virtual machines 110 perform I/O operations with a plurality of devices (not shown) through the host machine 120, and such I/O operation is performed through one physical I/O device 130. As used herein, 'computing platform' performs a method for handling network I/O device virtualization, and may be also referred to as a virtualization apparatus.

Respective of the plurality of virtual machines 110 may include applications 111_1, 111_2, . . . , 111_n (hereinafter referred to as 111) performing operations such as I/O, network stacks 113_1, 113_2, . . . , 113_n (hereinafter referred to as 113) existing in guest operating system kernels, and device drivers 115_1, 115_2, . . . , 115_n (hereinafter referred to as 115) performing network I/O.

Each virtual machine 110 operates in a guest operating system, and packets are generated through the network stack 113 existing in the guest operating system kernel. The generated packet tries to input to a virtually created device through the device driver 115. For example, the virtual machine 110 may generate an I/O request signal in the form of a trap and forward it to the host machine 120 (step 210).

The host machine 120 includes a virtual machine monitor 121 for generating and/or managing the virtual machines 110_1, 110_2, . . . , 110_n, a virtual machine emulator 123 for controlling access of the virtual machines, and extended device drivers 125_1, 125_2, . . . , 125_n corresponding to the respective virtual machines 110_1, 110_2, . . . , 110_n.

The virtual machine monitor 121 is a logical platform for simultaneously executing a plurality of operation systems, which is also referred to as a hypervisor. The virtual machine monitor 121 supports scheduling or processing methods assigned to the plurality of virtual machines 110. For example, the virtual machine monitor 121 may include Xen, Citrix XenServer, VMware ESX Server, L4 microkernel, TRANGO, IBM POWER hypervisor (PRISM), Microsoft Hyper-V, parallel server, logical domain hypervisor of Oracle (SUN), VMware Server, VMware Workstation, VMware Fusion, QEMU, Microsoft's virtual PC and virtual server, virtual box of Oracle (SUN), and SWsoft's Parallels Workstation and Parallels Desktop.

When the virtual machine monitor 121 according to an embodiment of the present disclosure receives an interrupt including an I/O request (for example, VMexit indicating the end of virtual mode) from the virtual machine 110, the internal trap handler adjusts the scheduling policy for the virtual central processing unit (CPU) assigned to the virtual machine (step 220) and forwards the transmission instruction to the virtual machine emulator 123 (step 230).

The virtual machine emulator 123 has a device model. The virtual machine emulator 123 according to an embodiment of the present disclosure does not perform emulation of the I/O included in the transmission instruction received from the virtual machine monitor 121, but requests the virtual machine monitor 121 to perform address translation for the guest physical addresses (GPAs) included in the transmission instruction (step 240).

Since the virtual machine emulator 123 according to an embodiment of the present disclosure does not copy the packet information, it is possible to reduce an overhead due to the copying of the packet information. Accordingly, it is possible to reduce the I/O performance degradation that may occur in the process of the host machine 120 copying packet information for I/O in the computing platform 100a. In addition, the virtual machine emulator 123 according to an embodiment of the present disclosure requests only the address translation to the virtual machine monitor 121 without performing the emulation for the I/O request, and communicates only with the extended device driver 125 associated with the virtual machine, thereby reducing processing burden of the virtual machine emulator 123 itself.

In response to the address translation request from the virtual machine emulator 123, the virtual machine monitor 121 translates the guest physical address to the host physical address (HPA) (step 250), and forwards the translated address again to the virtual machine emulator 123 (step 255).

The virtual machine monitor 121 can perform address translation in different ways according to the respective virtual machines 110_1, 110_2, . . . , and 110_n, and manage memory mapping information for these virtual machines. For example, the virtual machine monitor 121 may perform different memory mappings according to the virtual machines 110.

The virtual machine emulator 123 transmits an instruction request including the translated address to the extended device driver 125. In one embodiment of the present disclosure, the host machine 120 includes extended device drivers 125_1, 125_2, . . . , 125_n mapped to the plurality of virtual machines 110_1, 110_2, . . . , 110_n, respectively, and the virtual machine emulator 123 forwards the translated address information to the extended device driver 125 associated with the virtual machine 110 that transmitted the I/O request (step 260).

In one embodiment of the present disclosure, the virtual machine emulator 123 may perform PCI and Memory Mapped Input Output (MMIO) access settings for mapping the respective device drivers 115_1, 115_2, . . . , 115_n in the virtual machines 110_1, 110_2, . . . , 110_n to the extended device driver 125, 125_2, . . . , 125_n. Thus, the mapped extended device driver 125 are respectively exposed to the virtual machines 110

As the extended device drivers 125_1, 125_2, . . . , 125_n of the host machine 120 are exposed to the virtual machines 110_1, 110_2, . . . , 110_n, device drivers managed by both the virtual machine 110 and the host machine 120 become the same, and, as a result, the virtual machine 110 can use the extended device driver exposed in the virtual machine as a native device driver inherently included in the virtual machine 110.

According to the various embodiments, an additional control channel between the device model of the virtual machine emulator 123 and the extended device driver 125 may be set using a kernel interface such as an IOCTL, and the virtual machine emulator 123 may transfer the translated address information to the extended device driver 125 via the set control channel.

Since the extended device driver is exposed to the virtual machine 110, information on the extended device driver associated with the virtual machine can be provided to the virtual machine emulator 123 from the time when the virtual machine makes an I/O request. In another embodiment, the virtual machine emulator 123 may identify the extended device driver 125 associated with the virtual machine based on the information on the virtual machine included in the I/O request provided from the virtual machine and forward the translated address information via the control channel.

The extended device driver 125 inserts the translated address information into the transmission queue and completes the transmission (step 270). By sending the transmission queue in this way, in the I/O request generated by the device driver 115 in the virtual machine 110, only the address and the instruction are processed through the control channel, and the data are directly forwarded to the physical I/O device 130 through direct memory access based on the translated instruction and the address.

The control channel and the data channel are separated from each other in the computing platform 100a according to the embodiment of the present disclosure so that a control channel is formed along the virtual machine monitor 121 and the virtual machine emulator 123 of the host machine 120 and a data channel is formed from the device driver 115 of the virtual machine 110 to the extended device driver 125. Accordingly, the operation of copying data into the host machine 120 accompanying the I/O request is unnecessary. That is, the separation of the control channel and the data channel can be achieved by separating the packet generated in the device driver 115 and processing it separately.

The computing platform 100a according to an embodiment of the present disclosure can provide the same effect as each virtual machine performing I/O through a native device driver by providing an extended device driver for each virtual machine. Furthermore, it is possible to access multiple virtual machines by utilizing one physical I/O device 130 without need of separate hardware such as SR-IOV (Single Root Input/Output Virtualization), whereby it can be implemented at a low cost.

However, since the virtual machine monitor 121 included in the computing platform 100a performs address translation for an I/O request, it may cause waste of the central processing unit whenever the I/O request occurs.

Figure 3:
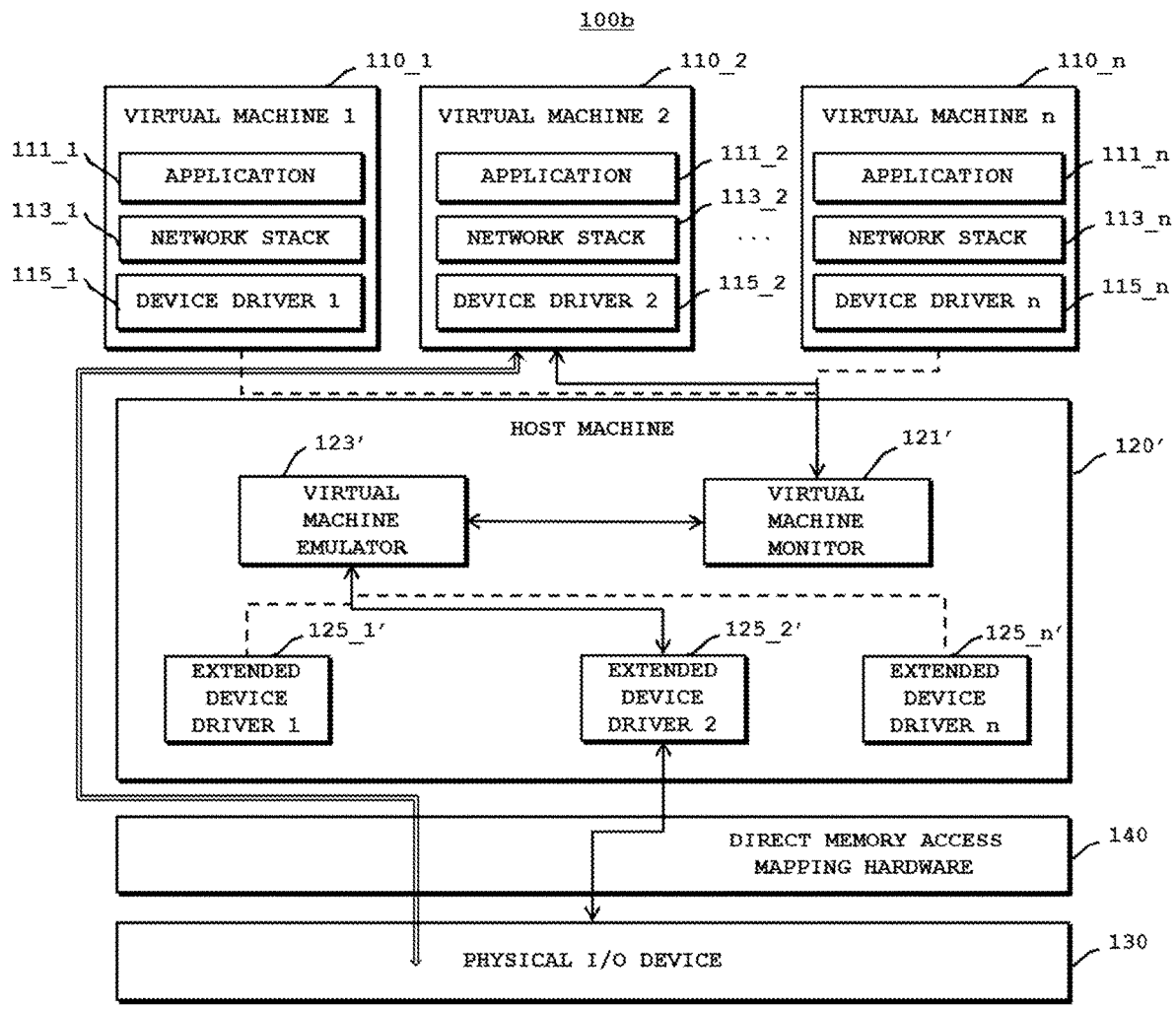
FIG. 3 is a diagram illustrating a computing platform according to an embodiment of the present disclosure.

FIG. 3 is a diagram illustrating a computing platform according to an embodiment of the present disclosure.

When compared to the computing platform 100a of FIG. 1, the computing platform 100b of FIG. 3 further includes direct memory access mapping hardware 140. Since the same reference numerals denote the same components which perform substantially the same operation, the description overlapping with the computing platform 100a of FIG. 1 will be omitted.

Referring to FIG. 3, the computing platform 100b includes direct memory access mapping hardware 140 to translate a guest physical address included in an I/O request forwarded from the virtual machine 110 into a host physical address. In contrast to the virtual machine monitor 121 performing address translation in the computing platform 100a described with reference to FIGS. 1 and 2, all of the plurality of virtual machines 110 share one direct memory access mapping hardware 140 and the direct memory access mapping hardware 140 may perform the address translation in the computing platform 100b of FIG. 3. Accordingly, it is not necessary to perform memory mapping every time an I/O request is made.

Specifically, the direct memory access mapping hardware 140 has a remapping context entry divided on a virtual machine basis.

Figure 4:
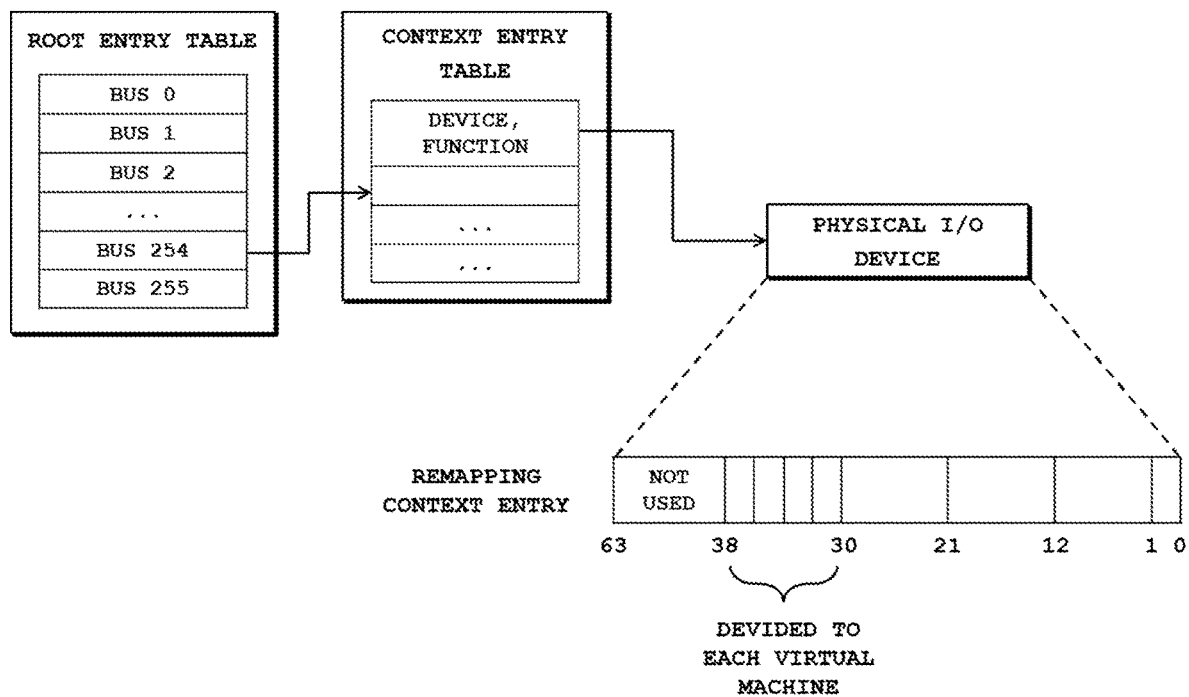
FIG. 4 is a diagram for explaining address translation of direct memory access mapping hardware according to an embodiment of the present disclosure.

FIG. 4 is a diagram for explaining address translation of direct memory access mapping hardware according to an embodiment of the present disclosure.

The domain mapping for the device is a two-level mapping that derives a context table pointer from the root entry table and maps the domain based on device and function information of the context entry table. The direct memory access mapping hardware 140 according to an embodiment of the present disclosure includes a remapping context entry, which logically divides a portion of the context entry table on a virtual machine basis and maps virtual machine addresses to the divided spaces.

By providing the remapping context entry, address remapping can be performed based on the virtual machine identifier instead of mapping the address based on the PCI information. Accordingly, a plurality of virtual machines may share one physical I/O device instead that a specific virtual machine exclusively uses the one physical I/O device.

Figure 5:
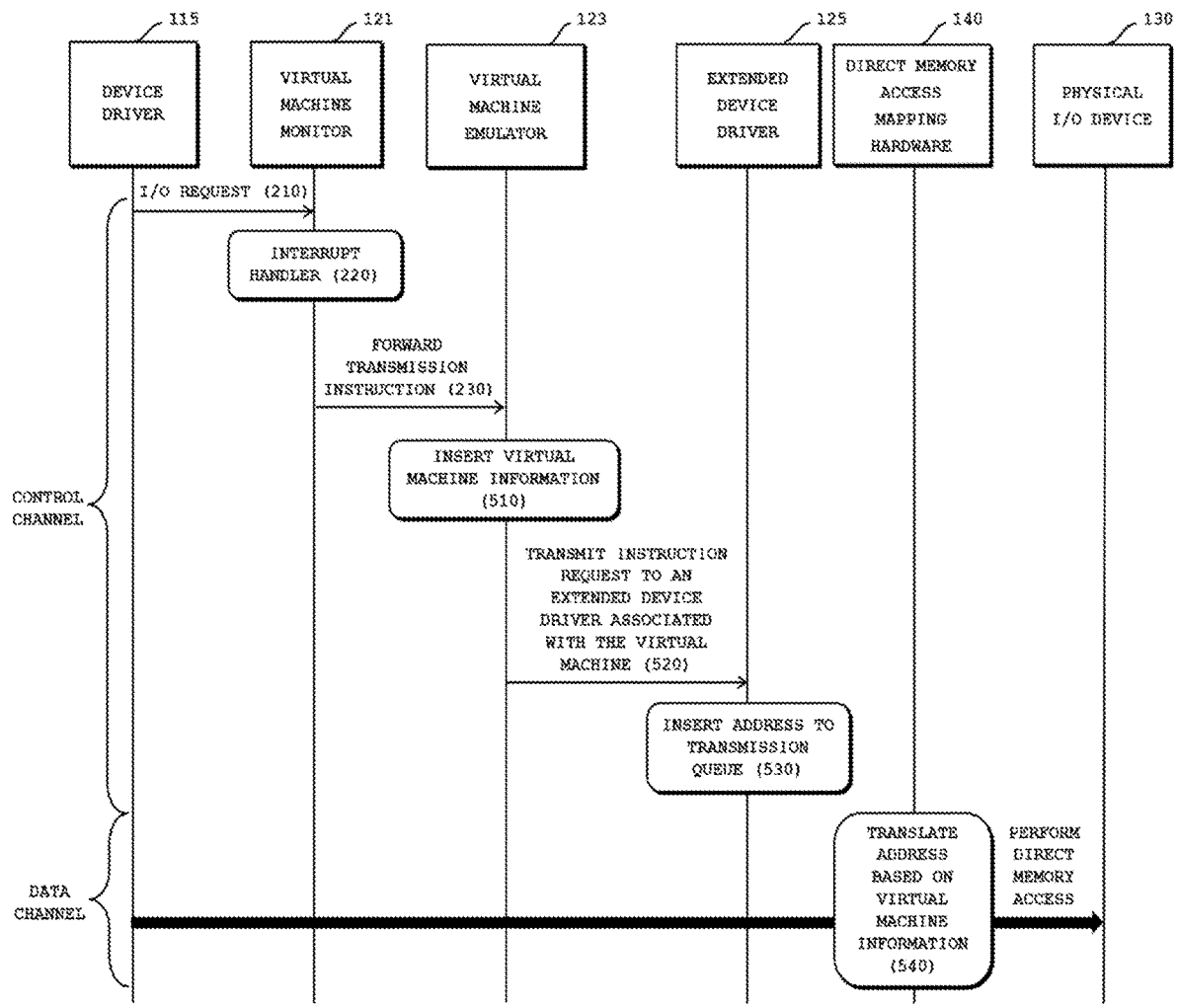
FIGS. 5 and 6 are sequence diagrams for explaining transmission and reception processes of the computing platform according to an embodiment of the present disclosure.
Figure 6:
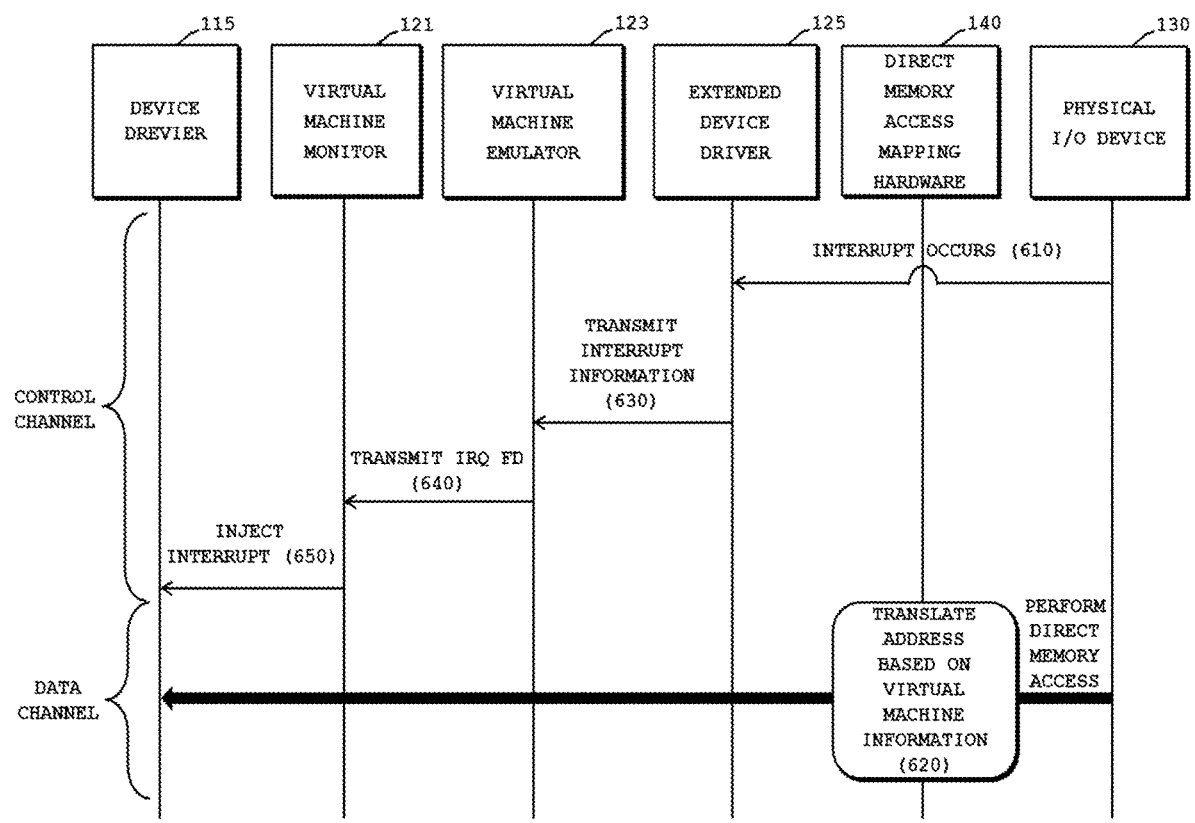

FIGS. 5 and 6 are sequence diagrams illustrating the operation of the computing platform described with reference to FIGS. 3 and 4. FIG. Specifically, FIG. 5 is a sequence diagram illustrating a transmission process of a virtual machine, and FIG. 6 is a sequence diagram illustrating a reception process of a virtual machine.

Referring to FIG. 5, an I/O request is generated in the device driver 115 in the virtual machine 110 (step 210), and the virtual machine monitor 121' in the host machine 120' captures the I/O request. The virtual machine monitor 121' executes an interrupt handler such as adjusting a scheduling policy for the virtual central processing unit assigned to the virtual machine 110 that has forwarded the I/O request (step 220), and forwards the transmission instruction to the virtual machine emulator 123' (Step 230).

The virtual machine monitor 121' and the virtual machine emulator 123' do not perform the operation of requesting address translation, but the virtual machine emulator 123' directly inserts information on the virtual machine 110 that forwarded the I/O request (step 510) and sent an instruction request to the extended device driver 125' associated with the corresponding virtual machine 110 (step 520).

As described above, the computing platform 100b according to an embodiment of the present disclosure includes the extended device drivers 125' corresponding to the respective virtual machines 110 in the host machine 120', and the extended device drivers 125' included in the host machine 120' are exposed in the virtual machine 110 to operate as the native device driver of the virtual machine 110. Therefore, the virtual machine emulator 123' included in the computing platform 100b according to an embodiment of the present disclosure can transmit the instruction request to the extended device driver 125' based on the information provided from the virtual machine 110, and such transmission may be made through a control channel between the device model in the virtual machine emulator 123' and the extended device driver 125'.

As the extended device driver 125' inserts the guest physical address into the transmission queue (step 530), direct memory access including data is performed from the device driver 115 in the virtual machine 110. In this process, an entry assigned to the virtual machine of the remapping context entry included in the direct memory access mapping hardware 140 is derived to translate the guest physical address into the host physical address (step 540). Based on the translated address, the direct memory access through the physical I/O device 130 is completed.

FIG. 6 is a sequence diagram illustrating a process in which an interrupt generated from the physical I/O device 130 is forwarded to the device driver 115 in the virtual machine 110. In FIG. 6, an interrupt occurs according to an access request from the external device to the virtual machine 110 (step 610). The generated interrupt includes information on a virtual machine to be accessed, and an interrupt is transmitted to the extended device driver 125 associated with the virtual machine 110 based on the information.

The extended device driver 125 transmits the interrupt information to the connected virtual machine emulator 123' via the control channel (step 630), and the virtual machine emulator 123' transmits the interrupt request file indicator (IRQ FD) to the virtual machine monitor 121' (Step 640). The virtual machine monitor 121' injects the interrupt into the device driver 115 according to the scheduling of the central processing unit assigned to the virtual machine 110 to which the interrupt is provided (step 650).

Address translation can be performed through the data channel simultaneously with or before or after the operation of the control channel. The direct memory access mapping hardware 140 derives a remapping context entry based on the virtual machine identification information included in the interrupt to translate the host physical address to the guest physical address in accordance with the occurrence of the interrupt (step 620).

The data provided to the physical I/O device 130 according to the translated address is forwarded to the guest physical address through the device driver 115 in the virtual machine 110.

As described above, the computing platform 100b according to an embodiment of the present disclosure can perform different address translations on the basis of virtual machine instead of PCI since the direct memory access mapping hardware 140 has context entries assigned for each virtual machine. Therefore, one single physical I/O device 130 can be shared by a plurality of virtual machines 110.

As the computing platform 100b according to an embodiment of the present disclosure performs address translation for a plurality of virtual machines 110 through one physical I/O device 130, it is possible to reduce the burden of the address translation of the virtual machine monitor 121' in the host machine 120' and have the effect described with reference to the computing platform 100a as well.

Figure 7:
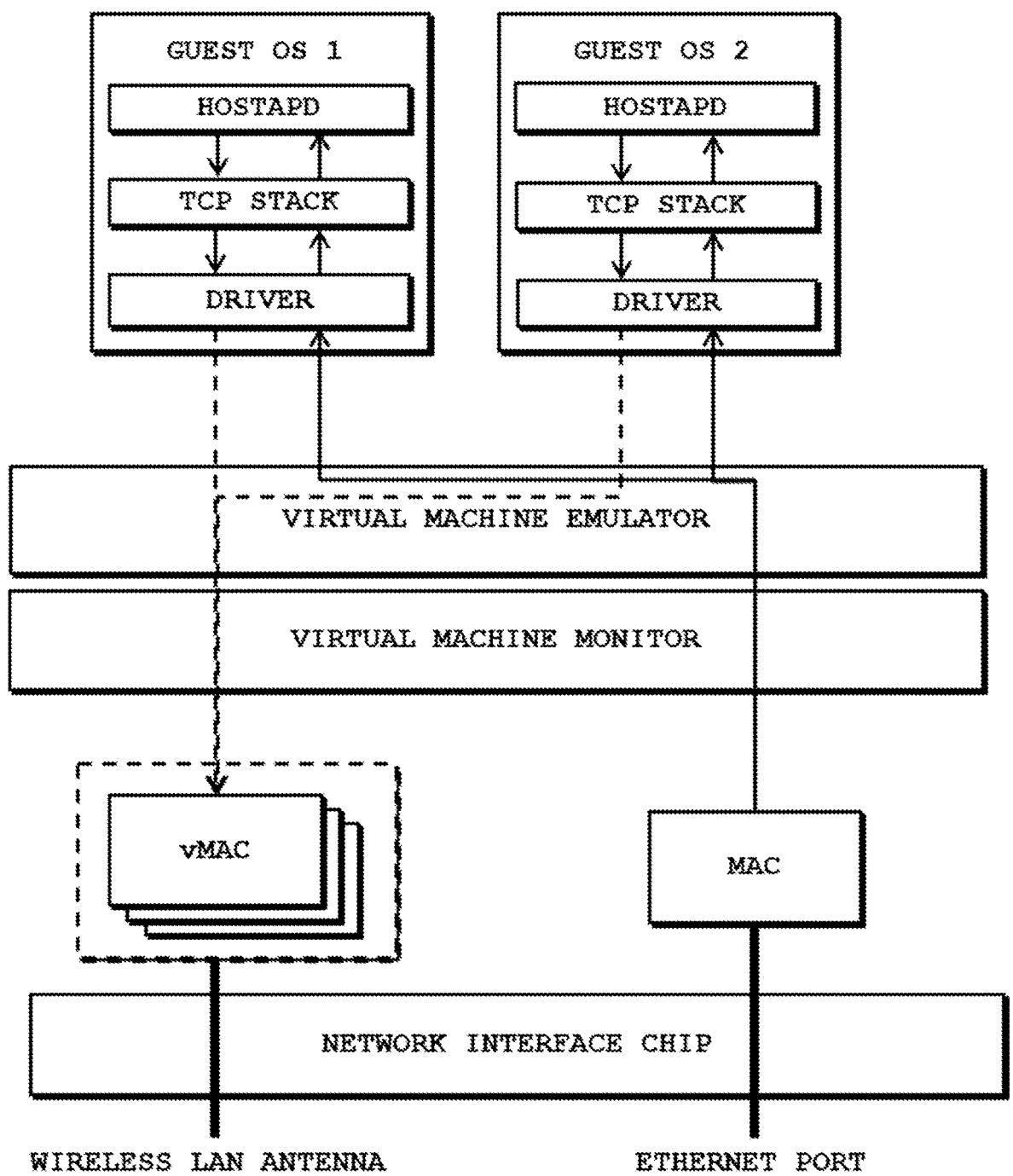
FIG. 7 is a diagram illustrating a computing platform according to another embodiment of the present disclosure.

FIG. 7 is a diagram illustrating a computing platform according to another embodiment of the present disclosure.

The computing platform 700 of FIG. 7 can configure a dual-band environment by configuring a router environment based on I/O virtualization and establishing a wireless channel even though only a single network interface chip (NIC) is provided.

Specifically, the computing platform 700 of FIG. 7 re-assigns an instruction to a network interface chip so that a plurality of guest OSs can communicate with a plurality of virtual medium access control through a virtual machine emulator and a virtual machine monitor.

Through this process, it is possible to solve the problem of incorporating two or more network interface chips in one wireless access point in case of dual band.

Various embodiments of the present invention may be implemented in hardware, firmware, software, or a combination of at least one of them. Various embodiments of the present invention may be implemented with instructions stored on a computer-readable storage medium that can be read and executed by one or more processors. A computer-readable storage medium is a physical medium for storing information, and may include volatile memory, non-volatile memory, optical storage medium, magnetic disk storage medium, and the like. Also, various embodiments of the present disclosure may include a computer-readable storage medium having instructions for performing the above-described methods recorded thereon.

The present invention has been described in detail with reference to the preferred embodiments shown in the drawings. It is to be understood that these embodiments are exemplary rather than limiting, and should be considered in an illustrative rather than a restrictive sense. The true scope of protection of the present invention should be determined by the technical idea of the appended claims rather than the above description. Although specific terms have been used herein, they are used for purposes of describing the concept of the invention only and are not used to limit the scope of the invention as defined in the claims. Each step of the present invention need not necessarily be performed in the order described, but may be performed in parallel, selectively, or individually.

It will be understood by those skilled in the art that various modifications and equivalent other embodiments are possible without departing from the spirit and scope of the invention as defined by the appended claims. It is to be understood that the equivalents include all components that are invented in order to perform the same function irrespective of the currently known equivalents as well as the equivalents to be developed in the future.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for handling network I/O device virtualization comprising:
    translating, by a virtual machine monitor, a guest physical address of a virtual machine to a host physical address in response to an I/O request from at least one virtual machine among a plurality of virtual machines;
    transmitting, by a virtual machine emulator, an instruction request including the translated address information to an extended device driver associated with the virtual machine from which the I/O request is forwarded;
    inserting, by the extended device driver, the translated address into a transmission queue; and
    performing a direct memory access for the I/O request using a physical I/O device according to the transmission queue,
    wherein a plurality of extended device drivers are provided in a host machine, the plurality of extended device drivers being mapped to the plurality of virtual machines, respectfully,
    wherein the plurality of extended device drivers are exposed in the plurality of virtual machines, respectively.

2. The method of claim 1, wherein the translating the guest physical address comprises, requesting, by the virtual machine emulator, an address translation to the virtual monitor upon receiving the I/O request.

3. The method of claim 2, further comprising:
    forming a control channel between a device model of the virtual machine emulator and the extended device driver using a kernel interface.

4. The method of claim 3, wherein the transmitting the instruction request comprises, transmitting the instruction request through the control channel of the extended device driver associated with a device model of the virtual machine.

5. The method of 1, wherein the virtual machine emulator does not perform emulation for the I/O request.

6. A non-transitory computer readable storage medium storing a program for executing the method of claim 1 by a computer.

7. A method for handling network I/O device virtualization comprising:
    forwarding a transmission instruction to a virtual machine emulator by handling an I/O request interrupt from at least one virtual machine of a plurality of virtual machines;
    transmitting, by the virtual machine emulator, an instruction request to an extended device driver associated with a virtual machine by inserting information on the virtual machine which has forwarded the I/O request;

inserting, by the extended device driver, an address of the I/O request into a transmission queue; and translating, by direct memory access mapping hardware, a guest physical address of the address included in the transmission queue to a host physical address based on the identifier of the virtual machine that generated the interrupt, wherein a plurality of extended device drivers are provided in a host machine, the plurality of extended device drivers being mapped to the plurality of virtual machines, respectfully, wherein the plurality of extended device drivers are exposed in the plurality of virtual machines, respectively.

8. The method of claim 7, further comprising:

generating a remapping context entry including a context entry divided for each of the plurality of virtual machines.

9. The method of claim 8, wherein the translating comprises, performing, by the direct memory access mapping hardware, the address translation by mapping a domain from the remapping context entry based on the identifier of the virtual machine included in the transmission queue.

10. The method of claim 8, further comprising:

forming a control channel between a device model in the virtual machine emulator and the extended device driver using a kernel interface.

11. The method of claim 10, wherein transmitting an instruction request comprises, transmitting the instruction request through the control channel of the extended device driver associated with a device model of the virtual machine.

12. The method of 7, wherein the virtual machine emulator does not perform emulation for the I/O request.

13. A non-transitory computer readable storage medium storing a program for executing the method of claim 7 by a computer.

14. A method for handling network I/O device virtualization comprising:

generating a plurality of extended device drivers mapped to a plurality of virtual machines in a host machine;

performing access setting of the plurality of extended device drivers to expose the plurality of extended device drivers in the plurality of virtual machines;

inserting a host physical address into a transmission queue for each of the plurality of extended device drivers after translating a guest physical address included in an I/O request generated by at least one of the plurality of virtual machines into the host physical address; and performing a direct memory access based on the transmission queue through each of the plurality of extended device drivers, wherein the plurality of extended device drivers are exposed in the plurality of virtual machines, respectively.

15. The method of claim 14, wherein the inserting into the transmission queue comprises, translating, by a virtual machine monitor, the guest physical address into the host physical address in response to a request of the virtual machine emulator that received the I/O request.

16. The method of claim 14, further comprising:

forming a control channel between a device model of the virtual machine emulator and the plurality of extended device drivers.

17. A non-transitory computer readable storage medium storing a program for executing the method of claim 14 by a computer.

18. An apparatus for handling network I/O device virtualization comprising:

a direct memory access mapping hardware for managing a remapping context entry including a context entry assigned for a plurality of virtual machines; and a processor for assigning a plurality of extended device drivers to the plurality of virtual machines, respectively, and performing a direct memory access by forwarding an I/O request generated from at least one of the plurality of virtual machines to a transmission queue through the assigned extended device drivers and performing address translation based on the remapping context entry, wherein the plurality of extended device drivers are provided in a host machine, the plurality of extended device drivers being mapped to the plurality of virtual machines, respectfully, wherein the plurality of extended device drivers are exposed in the plurality of virtual machines, respectively.

19. The apparatus of claim 18, wherein the processor forms a control channel between a device model in the virtual machine emulator and the plurality of extended device drivers assigned for the plurality of virtual machines.

* * * * *